United States Patent [19]

Suzaki

[11] 3,825,330

[45] July 23, 1974

[54] MOTION PICTURE PROJECTOR DEVICE LOADED WITH A FILM CARTRIDGE

[75] Inventor: Kuniyoshi Suzaki, Tokyo, Japan

[73] Assignee: Canon Kabushiki Kaisha, Tokyo, Japan

[22] Filed: Feb. 22, 1973

[21] Appl. No.: 334,898

[30] Foreign Application Priority Data
Feb. 22, 1972 Japan............................. 47-18347
Feb. 24, 1972 Japan............................. 47-19269

[52] U.S. Cl................ 352/157, 352/123, 352/124, 242/192, 242/197, 242/198, 242/199, 242/200
[51] Int. Cl. .................................................. G03b 1/56
[58] Field of Search ........... 352/157, 123, 124, 158, 352/159, 72; 242/192, 197, 198, 199, 200; 226/91, 92

[56] References Cited
UNITED STATES PATENTS
3,040,945  6/1962  Lunzer............................ 352/158 X
3,429,518  2/1969  McKee............................. 352/158 X
3,584,943  6/1971  Roman............................ 352/158 X

*Primary Examiner*—Monroe H. Hayes
*Attorney, Agent, or Firm*—William R. Woodward; Flynn & Frishauf

[57] ABSTRACT

This specification discloses a motion picture projector loaded with a film cartridge supporting a film roll therein. The projector includes a stripper provided to make a resilient contact with said roll to strip a leader end portion off said film roll. The stripper has a strip passage surface for directing the stripped leader end portion from said film roll in a threading manner. A threading belt driven by three rollers is provided to make a pressure contact with said film roll to rotate the same in an unwinding direction. Two levers are provided to carry thereon said stripper and said threading rollers and belt, respectively. A connecting roller is further provided to transmit a drive to said threading rollers. The three levers together provide a linkage, which can be shifted to its operative position by actuating any one of the three levers.

24 Claims, 8 Drawing Figures

MOTION PICTURE PROJECTOR DEVICE LOADED WITH A FILM CARTRIDGE

BACKGROUND OF THE INVENTION

1. Field of the Invention

This invention relates to improvements in an automatic motion picture projector device provided with automatic film threading means, automatic film projecting means and automatic film rewinding means. More particularly, it relates to such a projector in which film threading means held in its threading position by the means for starting the operation may be shifted from such position to its nonthreading position by film presence detector means to convert the device into automatic projection mode, whereafter at the final stage of such projection mode, means for detecting the termination of the film supply having a film tension detector detecting when a predetermined amount of the film has been projected renders a film transport mechanism inoperative and restores and holds the rewinding position of the film rewind mechanism, and at the final stage of the rewinding process, said film presence detector means detects the absence of the film to thereby reset the device to its position ready for a subsequent automatic projection cycle.

2. Description of the Prior Art

An automatic motion picture projector of the described type is disclosed, for example, in U.S. Pat. No. 3,561,852, which shows the so-called semi-projector whose entire operation is controlled by switch means. In one case, such switch means should preferably be used to automatically operate the processes from film threading to film rewinding and in the other case, it will be desired to provide an entirely automatic projector even by eliminating such switch operation. The provision of fully automatized projector devices will be an imperative requisite especially in the field of education where new educational systems such as CAI (computer assisted instruction) have been developed whereby a computer at the center controls various educational equipments including such projectors and audio devices introduced into educational environments.

SUMMARY OF THE INVENTION

It is an object of the present invention to provide an automatic motion picture projector entirely automatized in compliance with the above-noted requirement.

It is another object of the present invention to provide an automatic motion picture projector device which comprises drive means for the device, start means for the device, film threading means for automatically moving a film leader end portion to a threading position from a supply reel upon operation of said start means, means for intermittently transporting the film, projection means having a light source and an optical projection system, means for rewinding the film from a take-up reel onto the supply reel, means for detecting the presence of the film in a predetermined film passage between the supply reel and the take-up reel, and means for detecting the tension of the film wound on the supply reel, whereby the presence of the film in said passage may be detected to automatically shift the film threading means to its inoperative position, the termination of the film supply may be detected to automatically render the film transport means inoperative and also automatically shift the film rewinding means to its operative position, and at the end of the film rewinding, the absence of the film in said film passage may be detected to automatically reset the rewind means to its inoperative position.

It is still another object of the present invention to provide a film threading mechanism for a motion picture projector device or the like which comprises a first and a second members pivotally supported on the body of said device, a third member pivotally connected to said first and second members to interconnect them so as to form a linkage, film stripper means including a stripper member carried by said second member and engageable with the film roll to strip a leader end of the film and a member cooperable with the stripper member to form at least a part of a film passage for the film after the stripping, and film threading means including a member carried by said third member and engageable with the film roll to rotate the same in the direction toward said stripper means and a member cooperable with said member to form at least a part of said film passage.

It is yet another object of the present invention to provide a film threading mechanism of the described type in which the film stripper means and the film threading means may be shifted between a first position in which they are engageable with the film roll and a second position in which they are not engageable with the film roll.

It is yet still another object of the present invention to provide a film threading mechanism of the described type which further comprises a film passage forming member also serving to guide the film from the film threading mechanism to the film transport mechanism, and means operable in response to the shift of the film threading mechanism from its second position to its first position to move at least a part of said film passage forming member from a wide passage forming position for permitting the film to form a loop to a narrow passage forming position for permitting the end of the film to pass into the film transport mechanism, and also operable in response to the shift of the film threading mechanism from its first position to its second position to move said part of said film passage forming member from said narrow passage forming position to said wide passage forming position.

BRIEF DESCRIPTION OF THE DRAWINGS

Other objects and features of the present invention will become fully apparent from the following detailed description of the invention taken in conjuction with the accompanying drawings, in which.

DESCRIPTION OF THE PREFERRED EMBODIMENTS

Figure 1:
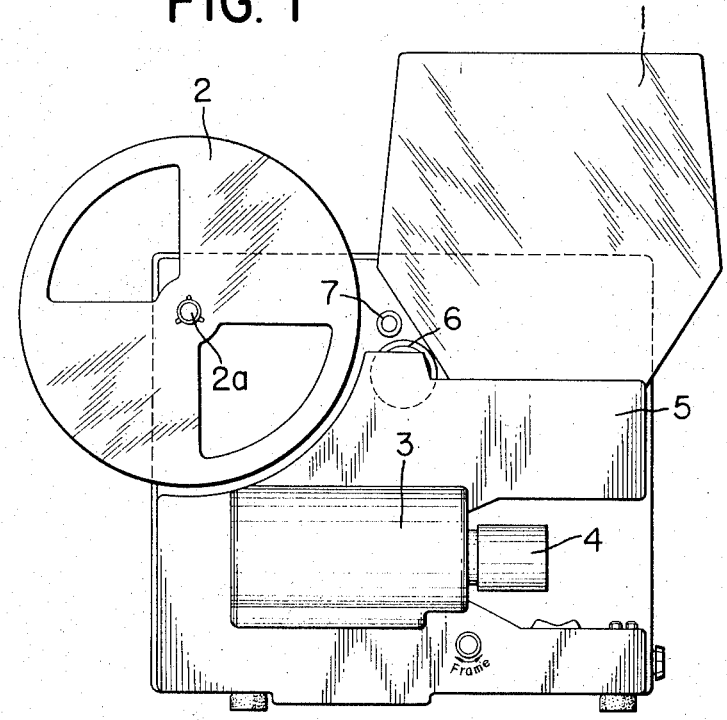
FIG. 1 is a front view showing the appearance of the automatic motion picture projector device according to an embodiment of the present invention.

Referring to FIG. 1, it shows the appearance of the automatic motion picture projector according to the present invention. A cartridge 1 containing therein a roll of film wound on a reel or the like (not shown) is positioned in place with respect to the projecting device. A film take-up reel 2 is mounted on a reel shaft 2a in the projector. The film contained in the cartridge 1 may be unwound by film threading means in a manner to be described, and then may pass through a projecting portion so as to be taken up on the take-up reel 2. A housing 3 covers the projecting portion and contains therein a light source for projection, an optical projection system, etc. A barrel 4 holds therein a projection lens forming the projecting system. The portion designated by numeral 5 contains therein means for threading a leader end portion of the film from the cartridge 1. A rewind drive roller 6 is carried by the body of the projector for engagement with the unshown reel having the film wound thereon within the cartridge 1. The roller 6 functions to rotate that reel counterclockwise in the figure to rewind the film into the cartridge 1 when it is desired to rewind the film. A guide roller 7 is provided to cooperate with the rewind drive roller 6 to rewind the film into the cartridge 1.

Figure 2:
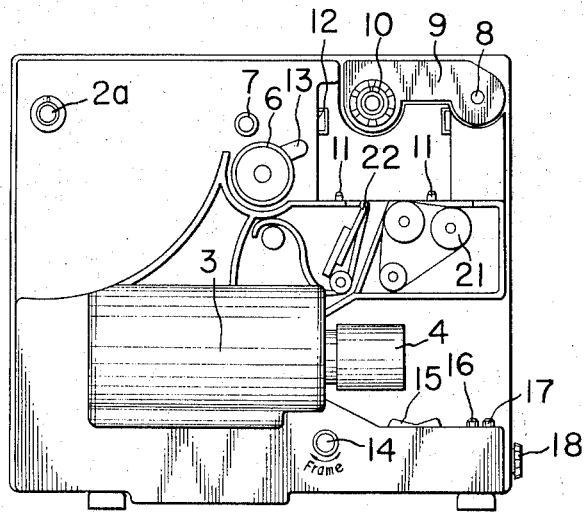
FIG. 2 is a front view of the same projector device with a take-up reel, a cartridge and a housing for the film threading mechanism being removed from the device.

Referring now to FIG. 2, the motion picture projector of FIG. 1 is shown in front view with the cartridge 1, the take-up reel 2 and a side plate of the housing 5 for the film threading means being removed therefrom. As seen there, a shaft 8 is studded in the body of the projector and supports a member 9 for rotation about the shaft. The rotatable member 9 carries thereon a supply reel supporting shaft which is useful when a cartridge with a reel shaft is not in use, i.e., when an open reel is in use. Thus, any of reels of various sizes may be mounted by rotating the rotatable member 9 about the supporting shaft 8 to adjust the position thereof in accordance with the variable size of the reel. A positioning member 11 is provided for use in loading the projector with a cartridge, and a latch member 12 is provided to fix the cartridge to the projector after the positioning thereof. In FIG. 1, the cartridge is shown to be mounted in position with respect to the projector by means of the above-described positioning member and latch member.

A guide groove 13 is formed to permit the rewind drive roller 6 to be moved to a position in which the film may be rewound into the cartridge by an unshown but known means. The projector device further includes an operating member 14 for adjusting the frame position, a main switch 15, an automatic projection start switch 16, a change-over member 17 for changing the mode to a "repeat" projection mode, and an operating member 18 for tilting the projector.

Figure 3:
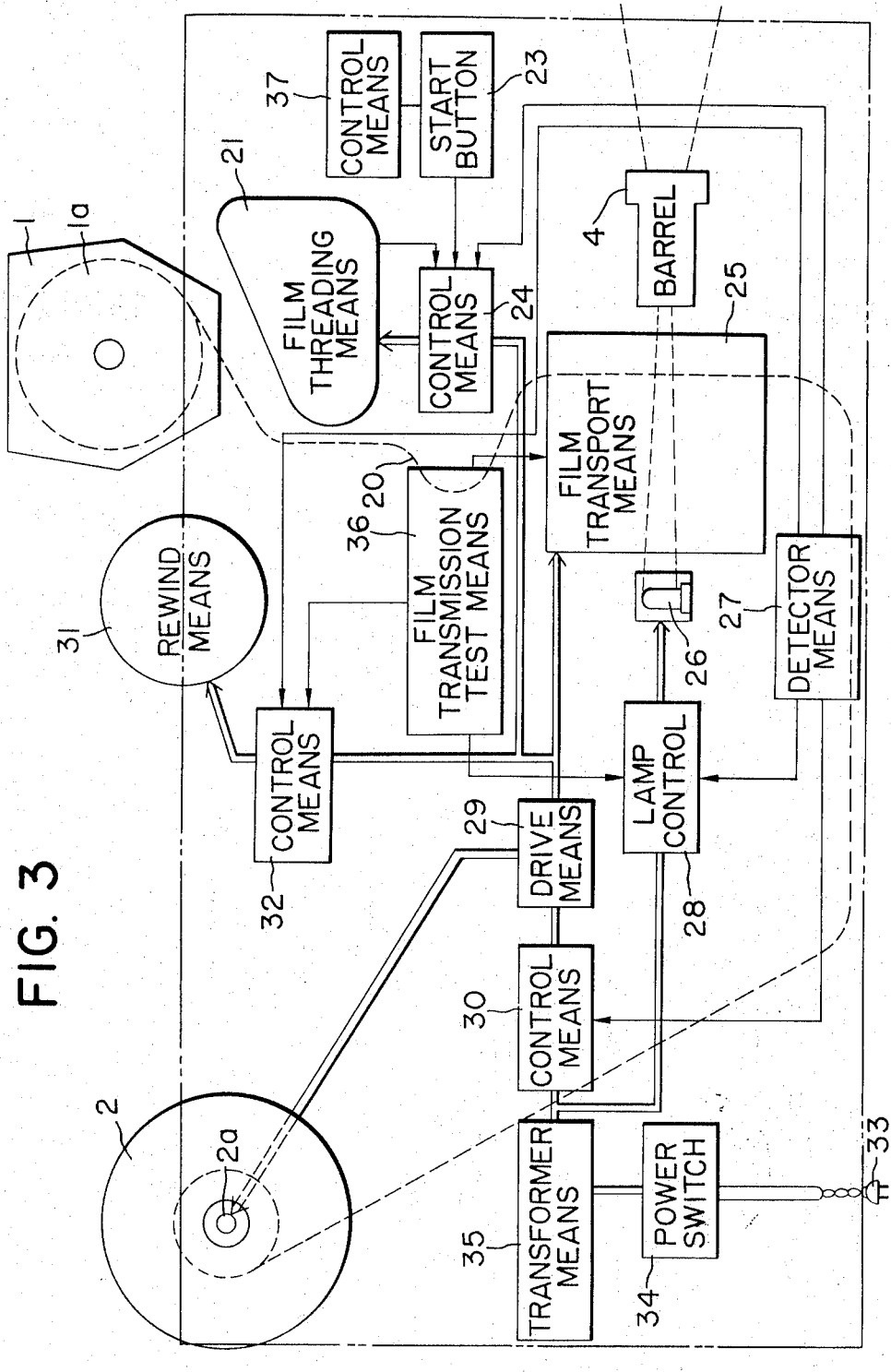
FIG. 3 is a block diagram schematically illustrating the essential portions of the automatic motion picture projector according to an embodiment of the present invention.

Turning to FIG. 3, the essential internal construction of the present projector is shown in block diagram. A film roll 1a is wound within the cartridge 1, and a length of film 20 is shown to be unwound from the film roll 1a to pass through the projecting portion until it is taken up by the take-up reel 2.

Numeral 21 designates film threading means which is carried by the projector body for pressure contact with the film roll within the cartridge 1 and cooperable with film stripper means (see FIG. 2) to thread the leader end portion of the film from the film roll out of the cartridge so as to reach film transport means which will be described. The essential construction of the film threading means 21 will be explained later. The film threading means 21 is adapted so as to be moved from its non-threading or inoperative position to its threading or operative position upon depression of the automatic projection start button 23 and also to receive the driving power from the drive means 29 of the projector device. Control means 24 for the film threading means 21 comprises an electromagnet or the like and functions to retain the start button 23. Well-known film transport means 25 is provided to effect proper intermittent transport of the threaded film 20 in the projecting portion. Numeral 26 designates a well-known light source for projection such as lamp, and numeral 4 is the aforesaid barrel accommodating the optical projection system therein. Detector means 27 for detecting the presence or absence of the film is provided in the film passage between the supply reel in the cartridge and the take-up reel, preferably in or near the film passge between the film transport means and the take-up reel. The detector means 27 may be in the form of a known switch or the like conventionally used for such purpose. There are four systems for transmitting the detection signal of the detector means representing the absence of the film. In a first system, such detection signal may be transmitted through a lamp control 28 to the light source or lamp 26 to turn on the same. In a second system, the detection signal may be transmitted to the aforesaid control means 24 for the film threading means, which control means 24 may thus return the film threading means 21 from its film threading position to its non-threading position. In a third system, the detection signal from the detector means 27 may be transmitted to control means 30 for controlling the speed of the device drive means 29 to change the speed thereof from a condition in which the film threading means is driven at a high speed to a condition in which the film threading means is driven at a lower speed which is the speed level of the film threading means during the normal picture projection. Further, in a fourth system, the detection signal may be transmitted to control means 32 for controlling film rewind means 31, which includes film rewind drive roller 6 and guide roller 7, so as to shift it to its rewind position, thus bringing the rewind means 31 to a position ready for film rewinding. The film rewind means 31 is connected to the device drive means 29 through the control means 32. The drive means 29 is also adapted to drive the reel shaft 2a of the take-up reel 2. The drive means 29 may comprise a known motor or the like, and is connected to an unshown external power source by a plug and to a power supply circuit including a transformer circuit 35 by a power switch 34.

Film termination detector means 36 is provided between the cartridge 1 and the film transport means 24 and functions to detect the intensity of tension in the film with the aid of a film tension detector provided therebetween to thereby detect the absence of the film rolled in the cartridge 1 and transmit such detection signal to the following three systems. This detector means 36 may be any known means which will be capable of detecting the termination of the film on the supply reel. In a first system, the detection signal is delivered to the film transport means 25 to stop the film transport operation thereof. In a second system, the detection signal is transmitted to the lamp control 28 to turn off the light source 26 connected with the power supply circuit. In a third system, the detection signal is sent to the control means 32 for the rewind drive means 31 to energize the latter means 31 to thereby cause the entire length of the projected film 20 to be automatically rewound from the take-up reel 2. Numeral 37 designates "repeat" projection control means which enables automatic projection to be repeated, and the construction thereof will later be described more specifically.

Figure 4:
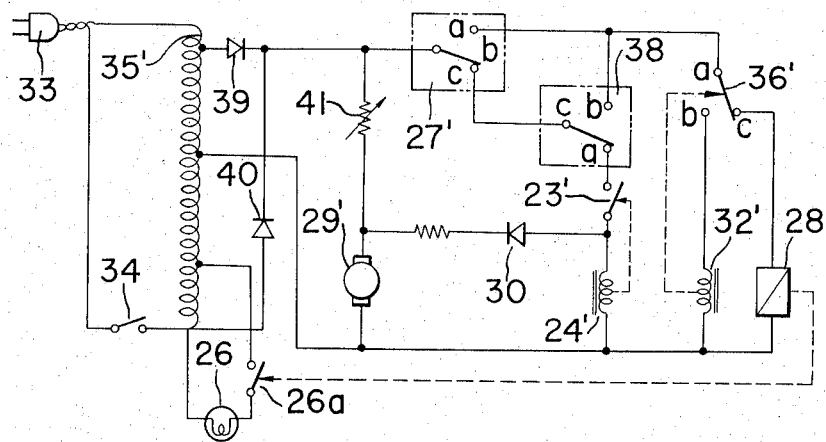
FIG. 4 is a circuit diagram of the electrical connection in the essential portions of the device shown in FIG. 3.

FIG. 4 diagrammatically shows an example of the electric circuit applicable to the automatic motion picture projector of the present invention. The electric circuit is structurally characterized in the following points:

1. A common contact 27'a of a change-over switch 27' forming the film presence detector means 27 is connected to a power source through a power supply circuit 35';
2. A common contact of a change-over switch 36' forming the film supply termination detector means 36 having the film tension detector is connected to the normally open contact 27'b of the change-over switch 27';
3. A solenoid 24' forming the control means 24 of the film threading means 21 is connected to the normally closed contact 27'c of the change-over switch 27' of the detector means 27 through a start button switch 23' and a safety switch 38;
4. A solenoid 32' forming the control means 32 of the rewind drive means is connected to the normally open contact 36'b of the change-over switch 36' for the film supply termination detector means 36; and
5. The lamp control 28 for controlling the opening-closing of the switch 26a of the light source 26 is connected to the normally closed contact 36'c of the change-over switch 36' of the said detector means 36.

In FIG. 4, other elements similar to those shown in FIG. 3 are given similar reference numerals. Numerals 39 and 40 designate diodes which are capable of rectification when the plug 33 is connected to an AC source. Numeral 41 designates a variable resistor connected in series with a DC motor 29' forming the device drive means 29. Numeral 30 is an impedance element connected to the motor 29' and start switch 23' for accelerating the driving speed of the motor 29' during the operation of the film threading means 21 up to a level higher than the speed at which the film transport means is driven during the normal picture projection.

When the last end of the supply film rolled within the cartridge is not secured to the supply reel in the cartridge, the safety switch 38 detects such fact to ensure the safety of operation of the projector device as soon as the film has entirely been taken up by the take-up reel at the end of the projection.

The change-over switch 27' forming the film presence detector means mentioned in the foregoing is designed such that the movable contact thereof is engaged with the normally closed contact 27'c in the absence of the film and engaged with the normally open contact 27'b in the presence of the film. The change-over switch 36' forming the film tension detector is designed such that the movable contact thereof is engaged with the normally open contact 36'b when the film is subjected to a back tension and engaged with the normally closed contact 36c when the film is subjected to no such tension. Solenoids 24' and 32' for the electromagnet coil serve to hold the start switch 23 in closed position and the change-over switch 36' in the position closed at the normally open contact 36'b.

An embodiment of the film threading means applicable to the present invention will now be described with reference to FIG. 5, which shows the threading mechanism retracted from the cartridge to its original position where the leading end portion of the film drawn out of the cartridge 1 has reached the film guide 42 of the known film transport means. It is seen that rollers 43, 44 and 45 are being rotated by a belt 46 entrained thereover. The three rollers are designed such that one of them, for example, the roller 45, is connected to the drive means 29 (see FIG. 3) to transmit the drive thereof to the other rollers 43 and 44 by means of the belt 46. A member 47 rotatably supports these rollers. A slide member 48 is connected to the support member 47 and slidably supported with respect to the device body by pins 49 and 50 studded in the device body and received in slots 51 and 52, so that the driven roller 43 may bear against the peripheral portion of the film roll 1a within the cartridge 1 with the belt 46 intervening therebetween. A stripper 53 is supported for engagement with the peripheral portion of the film roll 1a so that it can cooperate with the film threading means 21 including the said roller-belt assembly to strip the film leading end portion off the film roll 1a. The stripper 53 is supported by a support member 54, which in turn is supported on the device body for rotation about a support shaft 54a in the direction of arrow X by conventional electromagnetic means such as plunger 55, the support shaft 54a being studded in the device body.

Numeral 56 designates a device casing, in which a start button 23 for operating the film threading mechanism and a repeat button 37' are mounted. These operating buttons are formed with projections 23a and 36'a engageable with a lever 59 pivotable about a shaft 57 studded in the device body and spring-biased counter-clockwise by a spring 58 as viewed in FIG. 5. The repeat button 37' has its operating member 60, whose lower end forms an operation restraining portion 60a engageable with the retaining portion 63a of a retaining lever 63 which is pivotable about a shaft 62 studded in the device body and spring-biased clockwise by a spring 64. The start button 23 has its oprating member 61, whose lower end 61a can depress a projection 63b formed on the retaining lever 63, thereby causing the lever 63 to pivot counter-clockwise about the shaft 62 to release the engagement between the retaining portion 63a and the operation restraining portion 60a. Numeral 23' designates a microswitch corresponding to the start switch 23 shown in FIG. 4. The microswitch may be closed by the actuating portion 59a of the lever 59 upon clockwise rotation of the lever 59, thereby energizing the electromagnetic plunger 24a having the electromagnet 24', which in turn may attract the operating end portion 48a of the slide 48 to lift it with the threading mechanism. At the same time, the the microswitch 23' to attract the pivotable support member 54 of the stripper 53 and cause it to rotate in the direction of arrow X.

The operation of the present device will now be described with reference to FIGS. 3 to 5.

The main switch 34 is closed to start the device. Since the change-over switch 27' for the film presence detector means and the safety switch 38 are held in their positions as shown in FIG. 4, depression of the start button 23 causes its projection 23a to rotate the lever 59 clockwise about the shaft 57 against the force of the spring 58, thus closing the microswitch 23' to energize the plungers 24a and 55. Thus, the slide 48 with the support member 47 is caused to slide upwardly against the force of an unshown return spring and urge the driven roller 43 into contact with the periphery of the film roll 1a in the cartridge 1 with the belt 46 intervening therebetween, while the support member 54 of the stripper 53 is rotated in the direction of arrow X against the force of the return spring 54a to bring the pawled end 53a of the stripper 53 into engagement with the leading end of the film roll 1a. Even after the start button 23 has been released from depression, the end 59b of the lever 59 is being biased for clockwise rotation by the retaining portion 48b of the slide 48 which is being attracted upwardly by the plunger 24a, so that the lever 59 is held in such position to hold the microswitch 23' in its closed position. The driven roller 43, which is being driven to rotate by the motor 29' of the drive means 29 (see FIG. 3), urges the outer surface of the belt 46 into contact with the film roll 1a and thereby rotate the film roll. When the leader end portion of the film comes to the threading point, it is stripped off by the pawled portion 53a of the stripper 53, whereafter the film is advanced along a narrow passage defined between the side 53a of the stripper 53 and the outer surface 46a of the belt 46 and reaches a point from where the film is to be transported by the film transport means 25 (see FIG. 4). Thereafter, the presence of the film is detected by the film presence detector means 27, whereupon the common contact 27'a of the change-over switch 27' shifts into engagement with the normally open contact 27'b to deenergize the solenoid 24' and accordingly the plungers 24a and 55. Thus, the slide 48 is lowered by the force of the return spring and the stripper support member 54 is rotated clockwise by the return spring, whereby the various elements of the threading means restore the positions as shown in FIG. 5.

The change-over switch 36' forming the film tension detector is then being connected in the manner as shown in FIG. 4, so that the lamp control 28 is energized to close the switch 26a, thereby turning on the lamp 26 which thus provides a light source for projection. At this point of time, the impedance element 30 is non-conductive and eliminated from the drive circuit for the motor 29', whereby the motor 29' changes its speed from its previous high level to a speed for normally driving the film transport means 25. Thus, in the projecting portion, the film is intermittently transported with the successive pictures being projected through the projection system 4 and the film is subsequently taken up by the take-up reel driven from the drive means 29.

When all the length of the film 20 wound of the supply reel 1b is thus projected and taken up, the film will stop being transported any further if the trailing end of the film is secured to the reel in the cartridge. Thus, the detector means 36 having the film tension detector detects the termination of the film supply through the back tension or like factor then present in the film, and the detection signal is transmitted to the film transport means 25 to stop its film transporting action as previously described in connection with FIG. 3. Simultaneously therewith, the common contact 36'a of the change-over switch 36' forming the film tension detector detects the back tension in the film and is thereby connected with the normally open contact and so maintained by the solenoid 32'. On the other hand, the power supply to the lamp control 28 is cut off to open the switch 26a to thereby turn off the lamp 26. Also, the rewind control means 32 having the solenoid 32' shifts the rewind drive means 31 to its film rewind position while transmitting the high-speed drive from the drive means 29 to drive the reel in the cartridge 1 for rotation in the direction opposite to that during the projection, thus rewinding the film from the take-up reel 2 at a high speed. In this way, the lamp is turned off upon termination of the projection and the film is automatically rewound into the cartridge. Thereafter, at the final stage of the rewinding process, the leader portion of the film 20 passes the film presence detector means 27, whereupon this detector detects the absence of the film and the common contact 27'a of the change-over switch 27' forming the detector means shifts from the contact 27'b to the contact 27'c. This cuts off the power supply to the solenoid 32' included in the rewind control means, thus resetting the rewind drive means 31 to its inoperative position.

Under this condition, the automatic projector device is again ready to start its operation. Usually, a new cartridge may now replace the old cartridge and thereafter, the start button 23 may be depressed to perform the above-described series of operations from automatic projection to automatic rewind.

Figure 5:
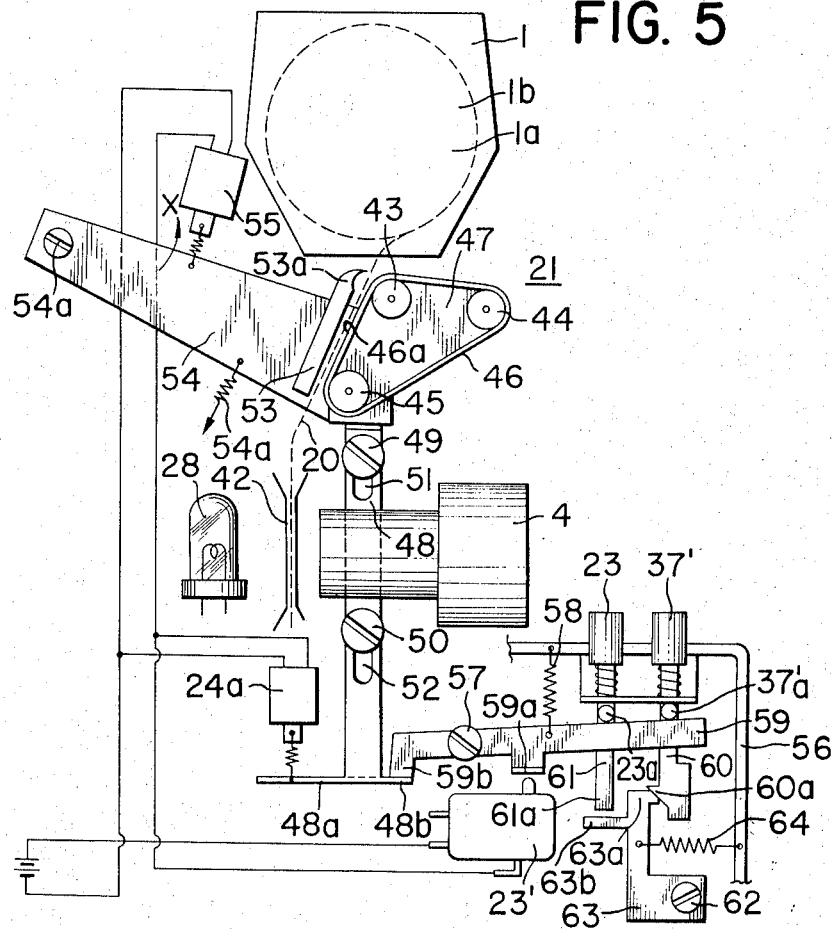
FIG. 5 shows, in front view, an embodiment of the film threading means applicable to the automatic motion picture projector of the present invention.

If it is desired again to effect automatic picture projection of the cartridge 1 containing the once projected film, then the repeat button 37' shown in FIG. 5 may be depressed instead of the start button 23. Upon depression of the repeat button 37', the projection 37'a causes the lever 59 to be rotated clockwise about the shaft 57 to thereby close the microswitch 23', whereafter there occurs entirely the same operations as in the case where the start button 23 has been depressed. The only exception is that, as previously noted, the depression of the repeat button 37' brings the restraining portion 60a of the button's operating member 60 into engagement with the retaining portion 63a of the retaining lever 63 to hold the repeat button 37' in its depressed position. By this, the lever 59 is maintained in a position for closing the microswitch 23' all the time threaded out with a result that the common contact 27'a of the change-over switch forming the film detector means 27 shifts from the normally closed contact 27'c to the normally open contact 27'b to deenergize the solenoid 24'. Thereafter, a normal picture projecting process and a film rewinding process take place successively in the manner described above and then the said common contact 27' a returns to the normally closed contact 27'c to re-energize the solenoid 24' due to the switch 23' remaining closed, so that the film threading means 21 shown in FIG. 5 is operated to effect a second film threading operation. Upon completion thereof, a second normal projecting process is entered and followed by a second rewinding process. Thereafter, the film is rewound back into the cartridge 1, whereupon a third automatic projection is ready to take place. In this way, the "repeat" projection may be carried out as frequently as desired. In order to terminate the repeat projection finally, the start switch 23 may be depressed to cause the end portion 61a of the operating member 61 thereof to rotate the retaining lever 63 counterclockwise about the shaft 62 to thereby release the engagement between the retaining portion 63a and the restraining portion 60a of the repeat operating member 60.

Instead of the described repeat projection, a multi-cartridge projection may also be carried out. This may be done by mounting to the projector device a cartridge loading means capable of containing a multiplicity of cartridges and by making such a design that each time the film rewinding process involved during a cycle of repeat projection has been completed, a used one of the cartridges in the cartridge container means is displaced upon return of the rewind means to its inoperative position so as to allow the next cartridge to assume a predetermined position.

It is to be noted that the safety switch 38 shown in FIG. 4 is provided to prevent the occurrence of the inconveniences to be described hereinafter. During the repeat projection or the multi-cartridge projection as described above, the film would all be taken up by the take-up reel 2 if the trailing end of the film is not secured to the cartridge, so that the change-over switch 27' of the film presence detector means 27 automatically shifts its contact 27'a into engagement with the contact 27'c to energize the solenoid 24', which in turn would vainly attempt to draw a film from a vacant cartridge. Such inconvenience may be prevented by the safety switch 38, which timely detects the outward emergence of the film end from the cartridge to change over from the normally closed contact a to the normally open contact b to maintain the solenoid deenergized to secure the operational safety of the automatic projector device.

Further, the above-described automatic rewinding operation may be replaced by a manual operation. This may be achieved by maintaining the automatic rewind means inoperative for the length of time required by the rewinding process so that such time may be directed to the use for the subsequent projecting process.

Figure 6:
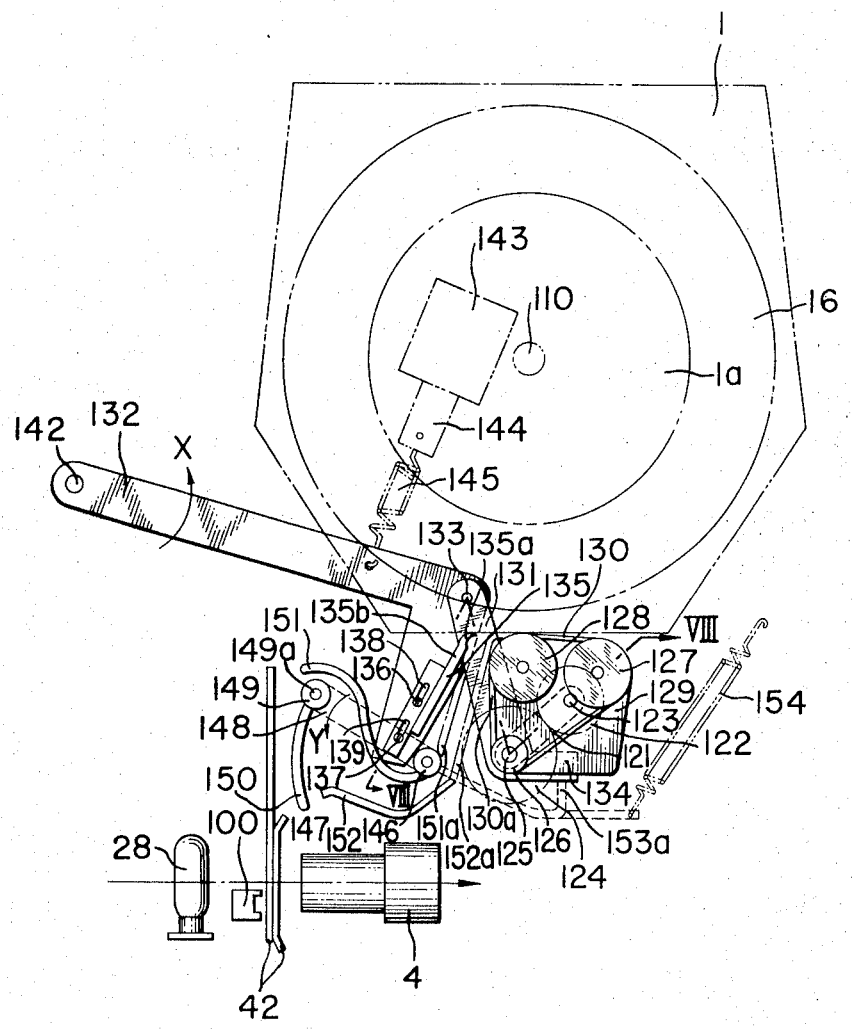
FIG. 6 is a front view of another embodiment of the film threading means applicable to the projector of the present invention and showing the threading means in its inoperative position.
Figure 7:
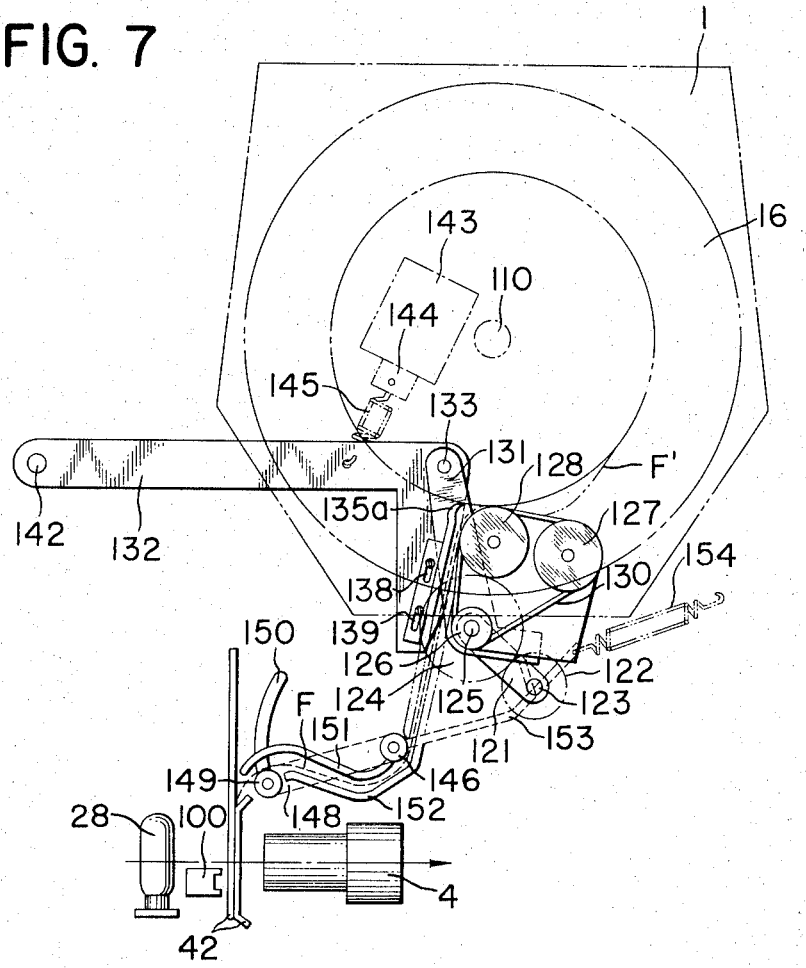
FIG. 7 is a view similar to FIG. 6 but showing the film threading means in its operative position.
Figure 8:
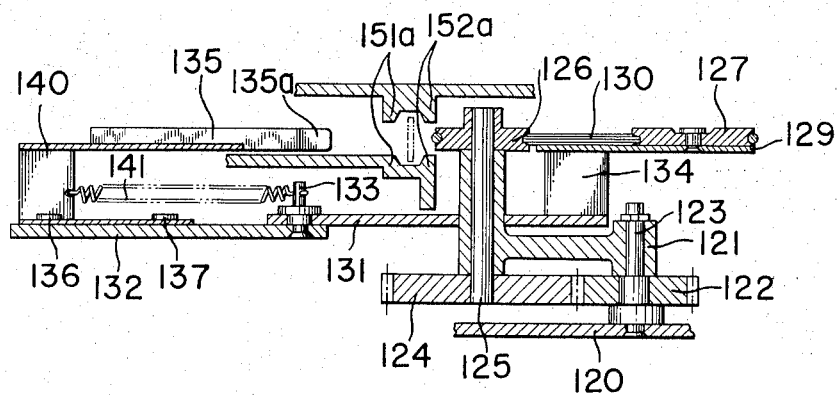
FIG. 8 is a cross-sectional view of the film threading means taken along lines VIII—VIII of FIG. 6.

FIGS. 6 to 8 illustrate another embodiment of the film threading mechanism applicable to the automatic projector device of the present invention. FIG. 6 shows the threading mechanism in a position before the film 1a rolled on the reel 1b in the cartridge 1 is threaded out of the cartridge. FIG. 7 shows the mechanism in a position where the leader end portion of the film roll 1a is being threaded out of the cartridge after the position of FIG. 6.

The construction of the mechanism will first be described with reference to these figures. Numeral 121 designates a first lever movable supported with respect to the body or base plate 120 of the motion picture projector by means of a drive gear 122 driven from an unshown but known drive means. A shaft 123 provides a support shaft for both the lever 121 and the drive gear 122 and is rotatably mounted on the body 120. A driven gear 124 meshes with the drive gear 122 and is rotatable with respect to the body of the projector. A driven gear shaft 125 supports the first lever 121 for rotation thereabout. A drive roller 126 is fixed to the shaft 125 on the first lever 121. Driven rollers 127 and 128 are rotatably supported on a support member 129 and cooperable with a later-described stripper to engage the film roll 1a in the cartridge with a belt 130 intervening therebetween. These rollers constitute the film threading mechanism. The belt 130 is entrained over the drive roller 126 and the driven rollers 127 and 128 to drive the latter two rollers. A third lever 131 is rotatable about a shaft 133 studded in a second lever 132. The other end of the third lever 131 is provided with a connector portion 134 which carries thereon the aforesaid roller support member 129. A stripper 135 is slidably carried by the second lever 132. The stripper 135 is formed with slots 138 and 139 for slidably receiving pins 136 and 137 studded in the second lever 132, and also has a connector portion 140, to which is connected a coil spring member 141 (see FIG. 8) having one end thereof secured to the shaft 133. Thus, the stripper 135 is biased for pressure contact with the film roll 1a in the cartridge 1. The stripper 135 has a pawled portion 135a engageable with the film roll 1a to strip the film leader end portion off the film roll, and a side 135b providing the passage for the stripped film leader end portion. The stripper side 135b and that portion of the belt 130 extending between the driven roller 128 and the drive roller 126 cooperate with each other to provide another film passage forming side 130a.

The second lever 132 is supported for rotation about a shaft 142 studded in the projector body. The third lever 131 is connected to the second lever 132 by the support shaft 133 as previously described, and the third lever 131 is operatively associated with the first lever 121 by the shaft 125. Thus, the first, second and third levers 121, 132 and 131 together constitute a so-called four-articulated linkage.

Operating means for rotating the second lever 132 about the shaft 142 may preferably be provided by a conventional electromagnetic plunger 143. The plunger has an actuating iron member 144 and a spring 144 and a spring 144 extended between and secured to the iron member 144 and the second lever 132.

A guide roller 146 is rotatably supported by the projector body and forms a part of the film passage. A lever 148 is pivotally mounted at one end on the support shaft 147 of the guide roller, and a tension roller 149 is rotatably supported on the lever 148 at the other end thereof. An arcuate slot 150 is formed in the projector body to permit and guide the rotation of the tension roller 149 and of the lever 148 about the shaft 147, and the shaft 149a of the tension roller 149 is engaged in the slot 150. The tension roller 149 and the lever 148 are spring-biased clockwise about the shaft 147 by an unshown spring member. A film passage forming member 151 is attached to the shaft 147 of the guide roller 146 and cooperates with another film passage forming member 152 secured to the projector body to provide a passage through which the threaded film can pass to a film transport mechanism.

Further passage forming members 151a and 152a are provided on the extensions of the described passage forming members 151 and 152 to guide the film immediately after threaded from the cartridge. As can be best seen in the cross-sectional view of FIG. 8, the upper and lower ends of these members are connected to define a tunnel-like film passage through which the film F may pass along a controlled path as indicated by imaginary lines. Further, the guide roller shaft 147 has attached thereto a lever 153 which follows the rotation of this shaft, as indicated by broken lines in FIGS. 6 and 7. A coil spring 154 having one end thereof secured to the projector body is connected to the other end of the lever 153 so as to normally bias this lever counter-clockwise about the shaft 147. A retaining member 153a is provided to engage the third lever 131 or the roller support member 129 at a side thereof to thereby control the position of the lever 153. Those members 153, 153a and 154 together constitute means for moving the film passage forming members.

Numeral 42 designates a film guide member in the above-described conventional film transport mechanism, and numeral 28 a light source.

Description will now be made of the operation of the present embodiment, particularly with respect to the shift from the FIG. 6 position, i.e., the position preceding the threading of the film from the reel 1b in the cartridge 1, to the FIG. 7 position in which the film threading begins to take place.

The second lever 132 pivotally supported on the projector body is rotated in the counter-clockwise direction of arrow X in pursuance to the actuating iron member 144 when attracted by the plunger 143 being electrically energized. The counter-clockwise rotation of the second lever 132 inparts an upward force to the third lever 131 pivotally carried by the support shaft 133 on the second lever 132, but since the shaft 125 connects the other end of the third lever 131 to the first lever 121 secured to the projector body by means of the shaft 123 to constitute a linkage as already noted, the counter-clockwise rotation of the second lever 132 causes clockwise rotation of the first lever 121 about the shaft 123, which in turn results in clockwise rotation of the third lever 131 about the pivot shaft 133 with the other end of the lever being restrained by the shaft 125. Thus, both the pawled end 135a of the stripper 135 carried by the second lever and the driven roller 128 carried by the support member 129 connected to the third lever bear against the periphery of the film roll 1a, so that the driven roller 128 is rotated counter-clockwise by means of gears 122, 124, shaft 125, drive roller 126 and belt 130 drivingly connected to the drive means, thereby causing frictional rotation of the film roll 1a. Such rotation in turn causes the leader end portion forming the outermost layer of the film roll 1a to be unwound from the film roll and bear against the portion of the belt 130 between the driven rollers 127 and 128, as indicated at F' in FIG. 7. However, since the belt is being driven counter-clcokwise or in the direction from the roller 127 toward the roller 128, the leader end portion F' is drawn leftwardly into the stripping space between the roller 128 and the pawled end 135a of the stripper, where the leader end portion F' is readily stripped off the film roll 1a and thereafter it is passed to the threading passage with the opposite sides thereof confined by the side 135a of the stripper 135 and the side 130a of the belt 130. The spacing between these sides 135a and 130a of the stripper 135 and belt 130 is wider in the inoperative position of the threading mechanism as shown in FIG. 6, but such spacing is made narrower to form a film threading passage in the operative position, as shown in FIG. 7, due to the counter-clockwise rotation of the second lever 132 carrying the stripper 135 and to the clockwise rotation of the third lever 131 carrying the support member 129 for the various rollers having the belt 130 entrained thereover.

In this manner, the threaded film leader end forming members 151a and 152a, under the control of the opposed sides of the stripper and belt 135 and 130 and reaches the vicinity of the guide roller 146. At this point of time, the lever 153 pivotally mounted to the guide roller 146 is being pulled by the coil spring 154 for counter-clockwise rotation about the shaft 147 as shown, until the retaining member 153a of the lever 153 bears against one side of the third lever 131 or of the roller support member 129, as is shown in FIG. 7. Thereby, the film passage forming member 151 integrally attached to the lever 153 is rotated counter-clockwise about the shaft 147 to narrow the spacing from the other film passage forming member 152 as shown in FIG. 7, so as to permit the film to automatically reach the guide member 155 of the transport means having a film transport claw 100. At this stage, the lever 148 carrying the tension roller 149 follows the rotation of the lever 153 to move down to the film threading position of FIG. 7 because the lever 148 is also connected to the lever 153 by means of a coil spring (not shown) wound around the shaft 147.

It will thus be seen that the leader end of the film can be passed from within the cartridge 1 to the film transport mechanism, as indicated by F in FIG. 7, so as to be ready for transport by the transport claw 100 and further for picture projection by the projecting means. After the film transport mechanism begins its operation, the film stripping and threading is no longer required and the film presence detector means provided in the path of the film as shown in FIG. 3 detects the presence of the film. The detection signal thus produced is transmitted to the drive means for the drive gear 122 of the aforesaid threading mechanism and to the plunger 143, to thereby deenergize the threading mechanism and retract the second lever to its inoperative position (see FIG. 6), thus returning the other elements of the threading mechanism to their inoperative positions.

This is followed by a normal film transport operation, during which the film passage forming member 151 and the lever 148 carrying the tension roller are both returned to their original positions, as shown in FIG. 6, by the lever 153 in response to the above-described resetting of the film threading mechanism. During the normal film transport, the film transport mechanism absorbs any shock imparted to the film by the intermittent film transport action, and for this reason, the lever 148 carrying the tension roller 149 is provided for rotation about the shaft 147 and along the slot 150 in the direction of arrow Y in FIG. 6, against the weak force of unshown spring, in response to the contact pressure of the film, so that the film can form a loop corresponding to the configuration of the film passage forming member 151.

The film stripping and threading mechanism illustrated in FIGS. 6 to 8 can be applied to the motion picture projector of FIGS. 1 to 5 by replacing the electromagnetic plunger 55 of FIG. 5 with that indicated by 143 in FIGS. 6 and 7 and without changing the rest of the mechanism. Thus, there can be provided an automatic motion picture projector using the mechanism as shown in FIGS. 6 to 8.

In the above-described embodiment, the operating means for shifting the film threading mechanism from the FIG. 6 position to he FIG. 7 position has been shown to comprise a plunger, whereas instead of this, a known friction member may be interposed, for example, between the driven gear 124 and the first lever 121 so that the first lever 121 may automatically be rotated clockwise about the shaft 123 with the counterclockwise rotation of the driven gear 124 to thereby accomplish the shift to the position of FIG. 7.

It will thus be appreciated that the present invention has succeeded in enabling the various cumbersome manual operations heretofore involved in the motion picture projectors, such as the film end threading process, projecting process and rewinding process to be entirely automized simply be depressing the start button. Thus, the present invention provides not only a greater simplicity of operation but also a great versatility for repeat projection or multi-cartridge projection in accordance with the program, which in turn leads to the provision of highly effective educational means applicable for group or individual educations. In addition, such means together with tape recorders and the like may be collectively controlled as terminal devices by a computer or like means. Thus, the present invention will find a great variety of applications and very high industrial merits.

Further, the film threading means applicable to the automatic motion picture projector of the present invention includes a four-articulated linkage comprising a first lever pivotable about a shaft journalled to the projector body, a second lever pivotable about another shaft journalled to the projector body, and a third lever having the opposite ends thereof pivotally connected to the first and second levers for operation by these two levers, the third lever carrying a threading roller driven by a belt or like means and the second lever carrying a stripper for friction engagement with the film roll. This construction permits the film threading means to be shifted between its inoperative and operative positions very simply by operating at least one of the first to third levers electromagnetically, mechanically or manually. Furthermore, the foregoing linkage enables the opposed sides of the film stripper and the belt member extending between the drive roller and the driven roller to define a film threading passage, whose clearance can automatically be made narrow enough to restrict the film threading passage in the operative position of the threading means and be made wide enough to impart no influence to the film passage forming members in the inoperative position of the threading means. Moreover, in response to the shift of the film threading means from its inoperative position to its operative position, at least part of the film passage forming members can be moved from a wide passage forming position for permitting the formation of film loop to a narrow passage forming position for advancing the film from the threading means to the film transport mechanism. Also, in response to the shift of the film threading means from its operative position to its inoperative position, at least part of the film passage forming members can be moved from the said narrow passage forming position to the said wide passage forming position. This means a greatly enhanced expediency in operating the film threading mechanism of the described type.

I claim:

1. A motion picture projector device loaded with a film cartridge supporting a film roll therein, said device comprising:

stripping means having an end portion adapted for resilient contact with said film roll to strip a leader end portion of the film off said film roll;

threading means adapted to make a pressure contact with said film roll to rotate the same in an unwinding direction so as to direct said leader end portion of said film roll toward said stripping means; and driving means for moving said stripping means and said threading means simultaneously from their rest positions to their operative positions for directing and stripping said leader end portion off the film roll;

said driving means including a first member movably supported on the body of said device, a second member supported on said body for movement along a different path from that of said first member, and a third member connected to said first and second members and adapted to follow the movement of said two members to freely move with respect to the body of said device to provide a linkage;

said second movable member and said third movable member carrying thereon said stripping means and said threading means, respectively;

whereby said driving means can be acutated upon operation of any one of said movable members forming said linkage.

2. A motion picture projector device according to claim 1, wherein said stripping means has a passage forming surface for directing away from said film roll the leader end portion stripped off by said end portion of said stripping means.

3. A motion picture projector device according to claim 1, wherein said threading means includes a drive roller, and a belt driven by said roller and adapted to contact said film roll.

4. A motion picture projector device according to claim 1, wherein said threading means has a passage forming portion for directing away from said film roll the leader end portion stripped off by said stripping means.

5. A motion picture projector device according to claim 1, wherein said driving means includes electromagnetic means for actuating at least one of said members forming said linkage.

6. A motion picture projector device according to claim 1, wherein said linkage of said driving means has four articulations.

7. A stripping and feeding mechanism for stripping a leader end portion of a strip material off a roll of said material, said mechanism comprising:

a stripper member having an end portion adapted for resilient contact with said roll of the strip material to strip the leader end portion off said roll;

threading means adapted to make a pressure contact with said roll to rotate the same in an unwinding direction so as to direct said leader end portion of said roll of the strip material toward said stripper member; and driving means for moving said stripper member and threading means simultaneously from their rest positions to their operative positions for stripping and directing said leader end portion off said roll;

said driving means including a linkage provided by a first movable member having one end thereof movably supported on said mechanism, a second movable member supported on said mechanism for movement along a different path from that of said first movable member, and a third freely movable member supported by said first and second movable members;

whereby upon operation of at least one of said members forming said linkage, said stripper member and said threading means may be moved simultaneously from their rest positions to their operative positions and said threading means may be brought into pressure contact with said leader end portion of said roll of the strip material to rotate said roll in an unwinding direction.

8. A mechanism according to claim 7, wherein said first movable member forming said linkage has a drive gear, and said third movable member has a gear driven by said drive gear, said driven gear being freely movable with respect to said mechanism while meshing with said drive gear.

9. A mechanism according to claim 7, wherein said driving means includes an actuating member connected to a part of said linkage and capable of urging said linkage toward said roll of the strip material.

10. A film threading mechanism for stripping a leader end portion of a film off a roll of said film wound in a film cartridge and feeding the stripped leader end portion of said film toward a projecting portion for said film, said mechanism comprising:

stripping means movable between a first position in which it makes a contact with said roll of film to strip said leader end portion of said film and a second position in which it is spaced apart from said roll of film to effect no stripping action;

threading means movable between a first position in which it makes a contact with said roll of film and a second position in which it is spaced apart from said roll of film;

driving means for moving said stripping means and said threading means from their second positions to their first positions;

said driving means including a linkage provided by a first member movably supported on said mechanism, a second member movably supported on said mechanism for movement along a different path from that of said first member, and a third freely movable member supported by said first and second movable members;

actuating means operatively connected to said driving means to acutate said driving means for a predetermined length of time so as to move said stripping means and said threading means to their first positions and hold them in such positions; and film passage forming means for guiding the stripped leader end portion between said stripping means and said projecting portion.

11. A mechanism according to claim 10, wherein said film passage forming means includes a member engageable with said driving means, said member being normally biased into engagement with one of said movable members of said driving means.

12. A motion picture projector in which a leader end portion of a film roll contained in a film cartridge is stripped off said roll for projection and the film is automatically rewound from a take-up reel upon completion of the projection, said projector comprising:

stripper means for stripping the leader end portion off said roll;

threading means for directing leader end portion toward said stripper means in a threading manner;

a linkage having link members connected at four articulations for movably supporting said stripper means and said threading means;

film transport means for intermittently transporting said film;

film rewinding means for rewinding the film from said film take-up means into said film cartridge;

film detecting means for detecting the film in a predetermined film passage between said film cartridge and said film take-up means;

film threading control means connected to said film detecting means; and film rewind control means connected to said film detecting means;

said film detecting means detecting the presence of the film to operate said film threading control means to thereby deactivate said linkage, and operate said film rewind control means to thereby shift said film rewinding means to a position ready for film rewinding.

13. A motion picture projector according to claim 12, wherein said film detecting means has a film tension detector.

14. A motion picture projector according to claim 12, wherein said film detecting means has a film detector provided near the film passage between said film transport means and said film take-up means to detect the film leader end portion threaded by said threading means.

15. A motion picture projector in which a leader end portion of a film roll contained in a film cartridge is stripped off said roll for projection and the film is automatically rewound from a take-up reel upon completion of the projection, said projector comprising:

drive source means for said motion picture projector;

stripper means adapted to make a resilient contact with said film roll to strip the leader end portion off said roll;

threading means adapted to make a pressure contact with said roll to rotate the same in a film-unwinding direction so as to direct said leader end portion toward said stripper means;

a linkage for driving said stripper means and said threading means, said linkage having an actuating member and a movable member supporting said threading means;

film transport means connected to said drive source means for intermittently transporting said film;

film take-up means for winding the transported film;

film rewinding means operatively connected to said drive source means for rewinding the film from said film take-up means into said film cartridge;

film detecting means for detecting the film in a predetermined film passage between said film cartridge and said film take-up means;

film threading control means connected to said film detecting means and including repeat projection control switching means changeable over between its operative position and its inoperative position, said switching means in its operative position being responsive to a signal input from said film detecting means to make said threading means ready for repetitive operation; and film rewind control means connected to said film detecting means;

said film detecting means detecting the presence of the film to operate said film threading control means to thereby deactivate said linkage, and operate said film rewind control means to thereby shift said film rewinding means to a position ready for film rewinding.

16. A motion picture projector according to claim 12, wherein said film detecting means includes a detector for detecting the termination of said film roll within said film cartridge to produce a film termination signal which is transmitted to said film rewind control means to drive said film rewinding means from its preparatory position to its rewinding position.

17. A motion picture projector in which a leader end portion of a film roll contained in a film cartridge is stripped off said roll for projection and the film is automatically rewound from a take-up reel upon completion of the projection, said projector comprising:

stripper means for stripping the leader end portion off said roll;

threading means for directing said leader end portion toward said stripper means;

a linkage having link members connected at four articulations for movably supporting said stripper means and said threading means;

film transport means for intermittently transporting said film;

film take-up means for winding the transported film;

film rewinding means for rewinding the film from said film take-up means into said film cartridge;

detecting means for the film in its passage having a first detector to detect when said leader end portion of the film is threaded and a second detector to detect when all the film has been transported to said transport means;

film threading control means for actuating said threading means in response to said first detector; and film rewind control means for actuating said rewinding means in response to said second detector.

18. A motion picture projector loaded with a film cartridge supporting a roll of film therein, comprising:

film cartridge retaining means;
drive means for said motion picture projector;
stripper means adapted to make a resilient contact with said film roll to strip a leader end portion off said roll film;
threading means adapted to make a pressure contact with said roll to rotate the same in a film-unwinding direction so as to direct said leader end toward said stripper means;
a linkage carrying thereon said stripper means and said threading means and movable to shift them from their rest positions to their operative positions;

film transport means connected to said drive means for intermittently transporting said film;
film take-up means for winding the film transported by said transport means;
film rewinding means operatively connected to said drive means for rewinding the film from said take-up means into said cartridge;
detecting means for detecting the film in a predetermined passage therefor and producing control signals to deactivate said linkage and to actuate said transport means, respectively, said detecting means further producing a signal when all the film has been transported to actuate said film rewinding means;
starter means for actuating said linkage; and repeat projection means for holding said starter means in operative position;
said linkage being re-actuated in response to a signal produced by said detecting means when the film is absent during the operation of said repeat projection means, thereby permitting the threading of the leader end portion of the film rewound in said cartridge.

19. A motion picture projector loaded with a film cartridge supporting a roll of film therein and having a threading mechanism for removing a leader end portion of said film roll from the same in said film cartridge, comprising in combination:

film threading means having a threading member adapted to make a pressure contact with said roll of film and to rotate the same in a film-unwinding direction in a threading manner, and a linkage movably supporting said threading member, said linkage including link members connected at four articulations;
driving means connected to said threading means for rotatively driving said threading member in said film-unwinding direction;
drive source means having a prime mover operatively connected to said driving means;
film transport means operatively connected to said drive source means for intermittently transporting said film in a normal film projection manner; and control means for said driving means and said film transport means having an electric circuit including said prime mover, said electric circuit having an impedance changing element for changing the speed of said prime mover when driving said threading means.

20. In a motion picture projector loaded with a film cartridge supporting a roll of film therein, a combination comprising:

a prime mover connected to an energy source;
film threading means for removing a leader end portion of said film roll from the same in said film cartridge in a threading manner;
a linkage movable supported with respect to said projector for moving said film threading means from its rest position to its operative position;
film transport means operatively connected to said prime mover for intermittently transporting said film in a projection manner;
a projection light source connected to said energy source;

film take-up means operatively connected to said prime mover for winding the transported film in a film take-up manner;

film rewinding means rotatably connected to said prime mover for rewinding the film back from said film take-up means;

film rewind control means connected to said prime mover;

speed control means connected to said energy source for said prime mover; and film detecting means having a detector for detecting said leader end portion of said film in a predetermined film path to produce a control signal which is transmitted to said film threading control means to deactivate the same, transmitted to said projection light source to turn on the same, transmitted to said speed control means to decelerate said prime mover, and transmitted to said film rewind control means to shift said film rewinding means into its preparatory position.

21. The combination according to claim 20, wherein said film detecting means further includes a detector for detecting the termination of the film in said film cartridge to produce a control signal which is transmitted to said film transport means to stop its transporting action, transmitted to said projection light source to turn off the same, and transmitted to said film rewind control means to shift said film rewinding means into its rewinding operation.

22. In a motion picture projector loaded with a film cartridge containing a roll of film therein and having a film-stripping means and a film-threading means for cooperatively removing a leader end portion of said film roll from the same in said film cartridge, the imporvement comprising:

link means for movably supporting said stripper means and said threading means;

said link means including a first member movably supported on said projector, a second member movably supported on said projector for movement along a different path from that of said first member, and a third member connected to said first and second members and adapted to follow the movement of said two members to freely move with respect to the body of said projector to provide a four-articulated linkage;

said linkage carrying thereon said stripping means and said threading means for simultaneous movement with respect to the body of the projector from their respective reset positions to their operative positions thereby to remove the leader end portion of the film roll from the same.

23. A device for stripping and feeding a strip material having a leader end portion from a roll of such material, said device comprising:

means for rotatably supporting said roll;

a stripper adapted for contact with said roll to strip the leader end portion off said roll;

threading means adapted to make a contact with said roll to direct said leader end portion of said roll toward said stripper; and link means having link members connected to form a linkage in such a manner that a portion thereof is freely movable with respect to the body of the device for movably supporting said stripper and said threading means with respect to the body of said device so as to simultaneously bring said stripper and said threading means into contact with said roll of the strip material upon actuation of said link members.

24. A motion picture projector in which a leader end portion of a film roll contained in a film cartridge is stripped off said roll for projection and the film is automatically rewound from a take-up reel upon completion of the projection, said projector comprising:

drive means for said motion picture projector;

stripper means adapted for contact with said film roll to strip the leader end portion off said roll;

threading means adapted to make contact with said roll to rotate the same in a film-unwinding direction so as to direct said leader end portion toward said stripper means;

film transport means connected to said drive means for intermittently transporting said film;

film take-up means for winding the transported film;

film rewinding means operatively connected to said drive means for rewinding the film from said film take-up means into said film cartridge;

a first detector to detect the presence and absence of the film in its predetermined passage;

a second detector to detect when the whole film in said film cartridge has been transported for its projection;

film threading control means for controlling the actuation of said threading means in such a manner that said film threading control means actuates said threading means in response to the first detector when it detects the absence of the film and to the non-detective condition of said second detector, and holds its actuation until said first detector detects the presence of the film;

film rewind control means for controlling the actuation of said film rewinding means in such a manner that said rewind control means actuates said film rewinding means in response to said first detector when it detects the presence of the film and to the second detector, and holds its actuation until said first detector detects the absence of the film;

said film transport means being actuated in response to the first detector when it detects the presence of the film and being operated until said second detector detects.

* * * * *